United States Patent [19]
Barks

[11] 3,890,072
[45] June 17, 1975

[54] APPARATUS FOR FORMING SOLID SPHERICAL PELLETS

[75] Inventor: Ronald E. Barks, Thompson, Conn.

[73] Assignee: Norton Company, Worcester, Mass.

[22] Filed: Sept. 4, 1973

[21] Appl. No.: 393,757

[52] U.S. Cl. .................................. 425/6; 425/332
[51] Int. Cl. ............................................ B22f 9/00
[58] Field of Search .......... 425/6, 332, 402; 264/13

[56] References Cited
UNITED STATES PATENTS

| | | | |
|---|---|---|---|
| 2,574,357 | 11/1951 | Stammer et al. | 425/6 X |
| 2,948,534 | 8/1960 | Huszar | 425/332 X |
| 3,006,291 | 10/1961 | Montez | 425/332 |
| 3,650,651 | 3/1972 | Turner | 425/332 X |
| 3,744,943 | 7/1973 | Bomberger et al. | 425/6 |
| 3,744,983 | 7/1973 | Jenkins | 425/6 X |

FOREIGN PATENTS OR APPLICATIONS

| | | | |
|---|---|---|---|
| 17,762 | 9/1906 | United Kingdom | 425/6 |

*Primary Examiner*—Al Lawrence Smith
*Assistant Examiner*—James G. Smith
*Attorney, Agent, or Firm*—Lewis M. Smith, Jr.

[57] ABSTRACT

Method and means of forming solid substantially spherical pellets from droplets of a slurry of finely divided solid aluminous particles and a deflocculant, delivered by gravity to and along a heated sloping surface at a temperature and of a length sufficient to dry the droplets of slurry en route therealong, and thereafter fired at the temperature and for the time necessary to fully develop high compressive strength and high temperature resistance therein.

9 Claims, 13 Drawing Figures

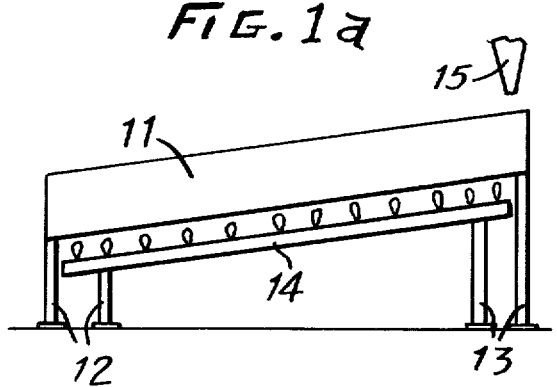
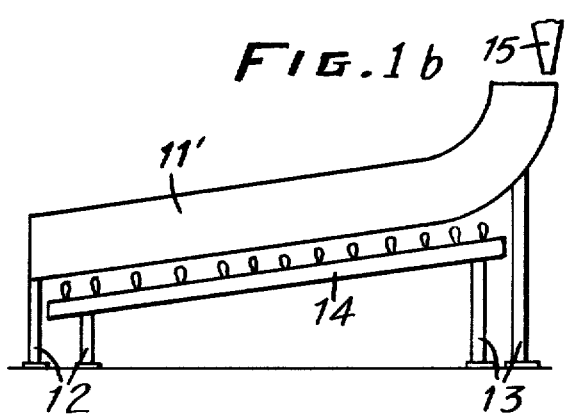
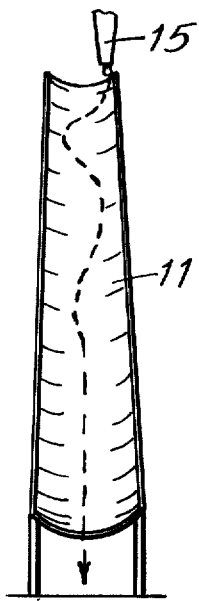
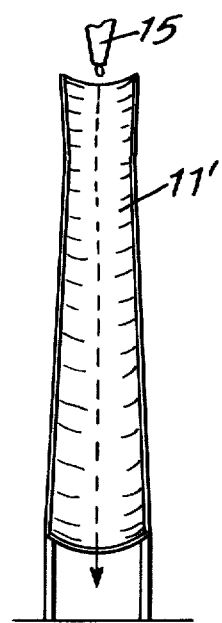
Fig. 2a
Fig. 2b
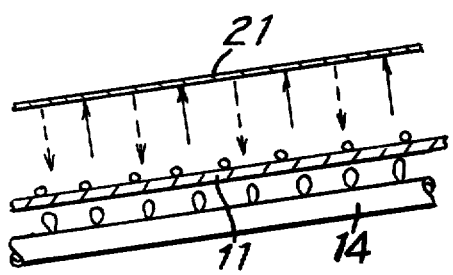
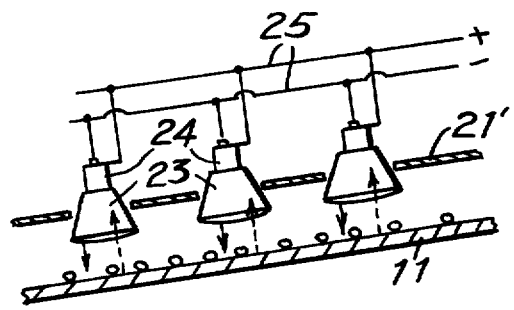
Fig. 5
Fig. 6

PATENTED JUN 17 1975　　　3,890,072
SHEET 2
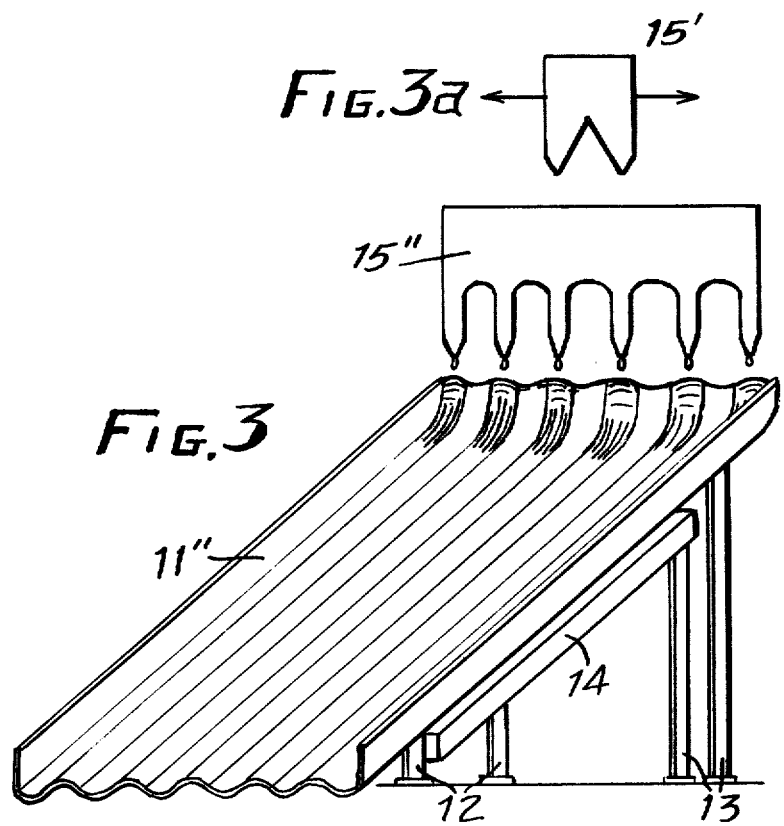
Fig.3a
Fig.3
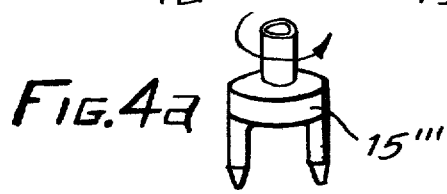
Fig.4a
Fig.4
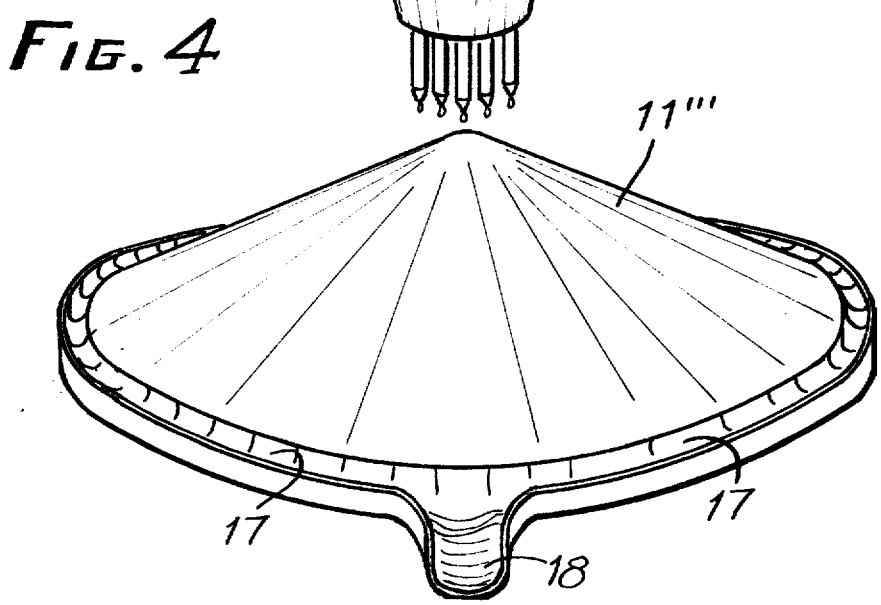

APPARATUS FOR FORMING SOLID SPHERICAL PELLETS

BACKGROUND OF THE INVENTION

1. Field of Invention

This invention relates to a method and a means of forming and drying substantially spherical pellets at ambient pressure for collection and transfer into suitable means for sintering the pellets so formed, without attendant agglomeration or deformation, to produce relatively high strength pellets, and particularly to the manufacture of relatively high strength pellets of aluminous material, bauxite, for example, alumina zirconia, or alumina, alone or in combination with an additive effective to provide enhanced properties, or dust collector fines, or the like.

2. Description of the Prior Art

U.S. Pat. No. 1,955,821 issued Apr. 24, 1934 to T. G. McDougal describes and claims a method of producing aluminum silicates in the form of crystals.

U.S. Pat. No. 2,187,432 issued Jan. 16, 1940 to M. A. Powers describes and claims a method and apparatus for the manufacture of hollow insulating pellets from a liquid or plastic vitreous material such as glass or the like that is rigid and impervious under atmospheric conditions.

U.S. Pat. No. 2,618,013 issued Nov. 18, 1952 to S. A. Weigand et al. describes and claims apparatus for forming metal pellets suitable for use in grit blasting operations.

U.S. Pat. No. 2,786,772 issued Mar. 26, 1957 to J. H. Stewart et al. describes and claims a method of making a cellular clay aggregate by passing spheres of the desired size, formed in a ball rolling machine, along a shaker hearth within a kiln.

U.S. Pat. No. 2,872,719 issued Feb. 10, 1959 to H. C. Brassfield et al, describes and claims a process for producing spherical pellets by causing small drops of a suspension of the material to be pelletized upon a surface of liquid repellant powder.

U.S. Pat. No. 2,963,824 issued Dec. 13, 1960 to A. D. Pinotti describes and claims a method of producing glass beads or spheres.

U.S. Pat. No. 3,092,553 issued June 4, 1963 to C. E. Fisher, Jr. et al. describes and claims a method of making droplet size solid, substantially homogeneous spheroidal beads containing a pharmacologically active ingredient, and the beads so produced.

SUMMARY OF THE INVENTION

The present invention contemplates a method and a means for the manufacture of solid, spherical pellets from an aluminous material, which, when they are subsequently fired, become highly resistant to crushing loads and resistant to relatively high temperatures, so that they are particularly suitable for use in oil well drilling operations as an oil well propping agent and are also well adapted to the relatively high temperatures developed in thermally activated oil wells.

Such pellets are also useful for surface conditioning, for peening, for blasting, and as the abrasive included in a bonded abrasive grinding wheel suitable for snagging stainless steel.

Pellets produced in the manner described below for each of the applications referred to above, or for any other application requiring pellets having high compressive strength and/or resistance to high temperatures, are subjected to a suitable subsequent firing cycle effective to produce fully sintered individual pellets. For example, pellets formed in the manner described below from a slurry containing the weight percentages of bauxite, water, and ferric ammonium citrate specified further below have been fired subsequently to 1450° C. for 5 minutes to reach a specific gravity of 3.81 at which they are extremely difficult to crush.

Dust collector fines accumulated while an arc furnace is being charged may also be formed into pellets in the manner described below, and then be charged into the arc furnace. Such pellets, formed for this application, need not be subjected to a subsequent firing cycle.

An object of this invention is the provision of a method for manufacturing solid, substantially spherical pellets which may be rendered highly resistant to substantial crushing forces by subsequently subjecting them to a firing cycle suitable for the material from which they are made.

Another object is the provision of means of manufacturing solid, substantially spherical pellets which may be rendered highly resistant to substantial crushing forces by subsequently subjecting them to a suitable firing cycle for the material from which they are made.

Still another object is the provision of a method of manufacturing solid, substantially spherical pellets which may be rendered highly resistant to elevated temperature levels.

Yet another object is the provision of means for manufacturing solid, substantially spherical pellets which may be rendered highly resistant to elevated temperatures.

A further object is the provision of a method of manufacturing solid, substantially spherical pellets first formed and dried, and then fired, to become highly resistant to substantial crushing forces and elevated temperatures, without resorting to the application of pressure in excess of ambient pressure.

Yet another object is the provision of means for manufacturing solid, substantially spherical pellets first formed and dried, and then fired, to become highly resistant to substantial compressive forces and elevated temperatures.

BRIEF DESCRIPTION OF THE DRAWINGS

Referring now to the drawings, in which like reference numerals refer to like or corresponding parts, wherein;

FIGS. 1a and 1b are front elevations of two embodiments of a heated sloping surface for the formation of solid pellets, characteristic of the instant invention, FIGS. 2a and 2b are left hand end views, as seen in the drawings, of the respective embodiments of the sloping surface of the instant invention shown in FIGS. 1a and 1b, FIG. 3 is a perspective view of an alternative embodiment of the heated sloping surface for the formation of solid pellets, characteristic of the instant invention, FIG. 3a is a schematic view of an alternative droplet delivery system, FIG. 4 is a perspective view of a conically shaped alternative embodiment of the heated sloping surface for forming solid, substantially spherical pellets, characteristic of the instant invention, FIG. 4a is a schematic view of an alternative droplet delivery system.

FIG. 5 is a side view, partially sectioned, illustrating a supplementary reflective surface useful with any one of the embodiments shown in FIGS. 1a and 2a, 1b and 2b, 3, 4, or 7 and 8a or 8b.

FIG. 6 is a side view, partially sectioned, illustrating an alternative disposition of the heat source above the sloping surface, and also illustrating an alternative supplementary reflective surface, both useful with any one of the embodiments shown in FIGS. 1a and 2a, 1b and 2b, 3, 4, or 7 and 8a or 8b.

DESCRIPTION OF THE PREFERRED EMBODIMENTS

Figure 7:
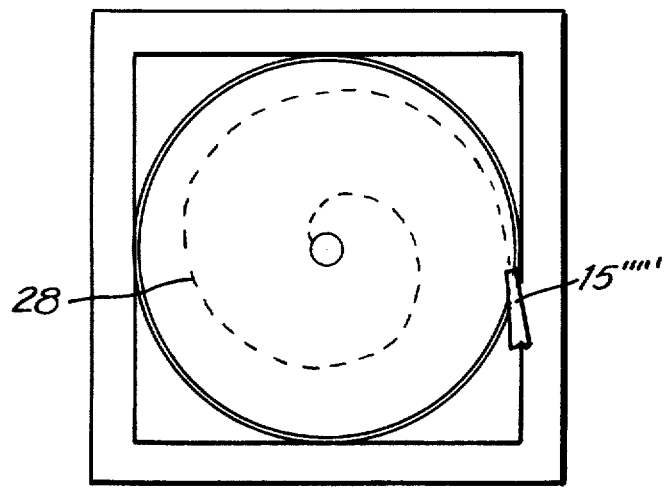
FIG. 7 is a top view of either of the alternative embodiments of the heated sloping surface shown in FIGS. 8a and 8b.

Referring first to the showing in FIGS. 1a and 2a, the structure characteristic of the instant invention, in its simplest embodiment, may conveniently consist of a sloping trough 11, formed of sheet metal or other suitable relatively rigid, smooth, temperature resistant material, and supporting means 12 and 13 therefor which may also support a gas heater assembly 14 or any other suitable source of sufficient heat along the length of the trough 11.

Drops of the slurry comprising a mixture of water and fine particles of the material from which the solid, substantially spherical pellets are formed may be deposited sequentially upon the surface of the trough 11 adjacent its upper end, as indicated schematically in FIG. 1a by the representation of a nozzle 15, or by any other suitable means of depositing droplets of the slurry upon the trough, the details of which form no part of the present invention.

In order to increase the effective length of the trough without a corresponding increase in the actual length of trough 11, itself, the source of droplets of the slurry, such as nozzle assembly 15, may be disposed as shown best in FIG. 2a so that the succeeding droplets are deposited substantially tangentially of the arcuately curved cross section of the trough 11 adjacent its upper end, so that the path traveled by succeeding droplets lengthwise of the trough 11 is at least partly sinuous, as indicated in FIG. 2a.

Alternatively, the upper end of the trough 11' may be arcuately curved lengthwise thereof as shown in FIG. 1b so that succeeding droplets, deposited upon the trough 11' from a source such as the nozzle 15 represented schematically in FIGS. 1b and 2b, are delivered substantially tangentially of the lengthwise section of the trough adjacent its upper end. In this embodiment, the droplets of a slurry may be so deposited upon the trough 11' that they travel down the center of the trough along its entire length, as illustrated best in FIG. 2b.

The arrangement illustrated in FIGS. 2a and 2b, or the arrangement illustrated in FIGS. 1a and 1b, may be ganged by providing a corrugated trough 11" mounted in operative relation to a nozzle manifold assembly 15" provided with a number of individual nozzles corresponding to the number of individual trough units, as shown in FIG. 3, or in operative relation to an assembly of transversely reciprocating nozzles 15', as shown in FIG. 3a.

The arrangement including a single elongated trough, as shown in FIGS. 1a and 1b and in FIGS. 2a and 2b, or the arrangement showing ganged troughs, as illustrated in FIG. 3, may be replaced with a generally conical sloping surface 11''' as shown in FIG. 4, in effect providing an infinite number of radially extending troughs at the upper ends of which multiple droplets of the slurry are deposited from a holding tank and multiple stationary nozzle assemblies 15'''' onto the conical surface of the trough member 11''' surrounded by a circumferential collecting trough 17 provided with a discharge chute 18, as shown in FIG. 4, or from a rotating nozzle assembly 15''', as shown in FIG. 4a.

As a further variation of any one of the embodiments illustrated in each of FIGS. 1a and 2a, FIGS. 1b and 2b, FIG. 3, or FIG. 4, or reduce the length of the trough 11, 11', 11", or 11''', and/or the amount of heat required to maintain the area immediately adjacent to the upper surface of the trough at the required temperature for adequately drying the series of ultimately solid, substantially spherical pellets, a heat reflective surface may be mounted above and spaced a short distance from the upper surface of the trough, in order to reflect back upon the drying pellets heat generated by the heater assembly 14 mounted beneath the trough, as shown in FIG. 5.

As a still further variation, the requisite heat may be supplied by an array of heaters such as infra-red lamps 23 or air guns or the like mounted above and closely adjacent to the upper surface of the trough 11, as shown in FIG. 6. Here, again, a supplemental heat reflective surface 21' may also be mounted above and closely adjacent to the upper surface of the trough, in order to provide a satisfactory temperature level with a minimum consumption of fuel.

Figure 8A:
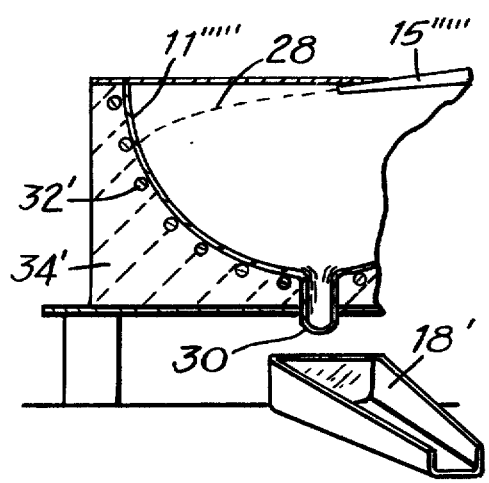
FIG. 8a is a vertical section, taken radially, of a bowl-shaped circular embodiment of the heated sloping surface.
Figure 8B:
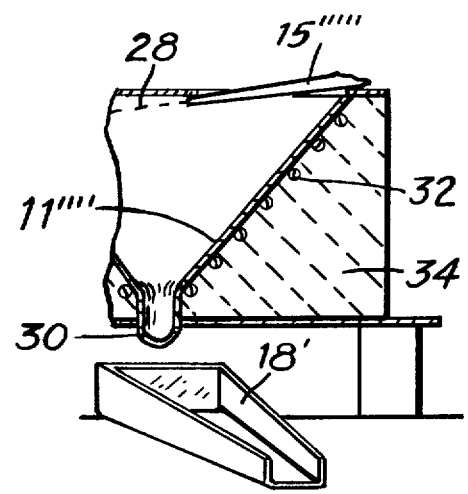
FIG. 8b is a vertical section, taken radially, of a conical embodiment of the heated sloping surface, inverted as compared to the embodiment shown in FIG. 4.

FIG. 8b illustrates an embodiment incorporating a conical heated sloping surface 11'''', inverted as compared to the embodiment shown in FIG. 4, to which droplets of the slurry are delivered substantially circumferentially, adjacent to its upper edge, through a nozzle 15'''''. The sloping surface is maintained at the proper temperature by any suitable heating means, for example, a series of heating coils 32 supported within an insulated supporting means 34, which may be made of fire brick. The dried pellets, having traveled along the spiral path 28 to and through the outlet opening 30, are collected in and discharged from the chute 18'.

The embodiment illustrated in FIG. 8a corresponds closely to the embodiment shown in FIG. 8b, except that this embodiment includes a bowl-shaped sloping surface 32' to which droplets of the slurry are delivered substantially circumferentially through a nozzle 15''''' or other suitable means. The bowl-shaped sloping surface may be heated by a series of heating coils 32' supported within an insulated supporting means 34' conformed to the shape of the sloping surface.

Referring particularly to the embodiments of the instant invention shown in FIGS. 1a and 1b, for example, successful results have been obtained using a trough about 8 feet long and about 6 inches wide at an angle of from about 10 to about 30° from the horizontal, depending upon the size of the pellets being produced, with the upper surface of the trough at or near red heat adjacent to the point at which the droplets are deposited upon the trough. The rest of the upper surface of the trough may be maintained at a somewhat lower temperature.

The indicated level of heat adjacent to the point at which the droplets are deposited upon the trough is that necessary to be sure that the water with particles entrained comprising each droplet maintains its characteristic substantially spherical shape due to the reaction of the water to the heat as each droplet starts down the length of the trough and starts to dry out.

A somewhat lower temperature is sufficient further down the trough as the droplets progressively dry out, because they are no longer fully dependent upon the ambient heat to maintain their spherical shape.

From inspection of the showing in FIGS. 1a and 1b and in the figures illustrating other embodiments of the invention, notwithstanding the simplified schematic representation in these drawings, it will be evident the spherical pellets formed by this invention are produced as they slide down the smoothly contoured sloping surface of one of the several configurations described and illustrated solely by the application of heat at the level indicated. In other words, these spherical pellets are formed and hardened in a normal atmospheric environment and at the ambient atmospheric pressure.

Referring now particularly to the embodiment of the invention shown in FIG. 8b, for example, successful results have been obtained using a conical sloping surface about 3 feet in diameter at the top and about 18 inches high with about a 45° slope heated as described immediately above. The conical sloping surface may be supported upon any suitable insulating material, for example, suitably shaped and disposed fire brick.

As a result of the sliding movement of the droplets along the heated sloping surface as they are converted into solid pellets, the generally spherical surface of each solid pellet may be interrupted by a small flat surface adjacent to the sloping surface on which the pellet rests, which has been found to enhance the resistance of a quantity of such pellets to a compressive force applied thereto, after the pellets so formed have been subjected to a firing cycle effective to sinter the material of which they are made.

For various materials to which the subject matter of this invention may usefully be applied, a deflocculant is necessarily or desirably included in the slurry. For example, pellets have been made successfully, using this invention, from a slurry including 62 weight percent bauxite (SWECO milled and drum dried), 37 weight percent water, and 1 weight percent ferric ammonium citrate. Other commercially available deflocculants useful with this invention include those identified in the trade as Darvan C and Darvan 7, available from the R. T. Vanderbilt Company, New York, N.Y.

For some end uses, it is not necessary to include any deflocculant in the slurry, for example in applications which do not require a subsequent firing cycle after the droplets of a slurry are dried according to the teachings of this invention.

It should be understood that the description of the present invention herein and the corresponding showing in the accompanying drawings is illustrative only, rather than limiting, and that the scope of the present invention is determined entirely by the several claims appended hereto.

What is claimed is:

1. An apparatus for forming substantially spherical solid pellets from droplets of a slurry of finely divided solid aluminous particles comprising a supporting means having a continuous smoothly contoured upper surface extending between a relatively higher upper end and a relatively depressed lower end thereof exposed along its entire length to the ambient pressure of a normal atmospheric environment, and a means for depositing droplets of said slurry upon the upper surface of said supporting means a drying means disposed adjacent to said supporting means and operative upon said droplets adjacent to the upper end of said supporting means so as to convert said droplets to dry relatively hard pellets by the time they slide down the upper surface of said supporting means to its lower end.

2. An apparatus for forming substantially spherical solid pellets from droplets of a slurry of finely divided solid aluminous particles, as described in claim 1, wherein:

the upper surface of said supporting means is transversely upwardly curvilinearly shaped at least adjacent the upper end of said supporting means, and the succession of droplets is deposited substantially tangentially of the transversely upwardly curvilinearly shaped upper end of said supporting means.

3. An apparatus for forming substantially spherical solid pellets from droplets of a slurry of finely divided solid aluminous particles, as described in claim 1, wherein:

the upper surface of said supporting means is upwardly curvilinearly shaped lengthwise thereof toward the vertical adjacent the upper end of said supporting means, and the succession of droplets is deposited substantially tangentially of the upwardly curvilinearly shaped upper end of said supporting means.

4. An apparatus for forming substantially spherical solid pellets from droplets of a slurry of finely divided solid aluminous particles, as described in claim 1, wherein:

the upper surface of said supporting means is contoured to form a series of individual channels, each extending substantially from the upper end to the lower end of said supporting means, and a succession of droplets is deposited in each channel adjacent the upper end of said supporting means.

5. An apparatus for forming substantially spherical solid pellets from droplets of a slurry of finely divided solid aluminous particles, as described in claim 1, wherein:

the upper surface of said supporting means is conically shaped, and a succession of droplets is deposited adjacent the upper extremity of the conical shape comprising the upper surface of said supporting means.

6. An apparatus for forming substantially spherical solid pellets from droplets of a slurry of finely divided solid aluminous particles, as described in claim 1, wherein:

said drying means comprises at least one heat source disposed beneath the upper surface of said supporting means between the upper end and the lower end thereof.

7. An apparatus for forming substantially spherical solid pellets from droplets of a slurry of finely divided solid aluminous particles, as described in claim 6, and in addition:

a heat reflective member with a lower surface disposed above and spaced from the upper surface of said supporting means a distance at least sufficient for the free passage of a succession of droplets between the upper surface of said supporting means and the lower surface of said heat reflective member.

8. An apparatus for forming substantially spherical solid pellets from droplets of a slurry of finely divided solid aluminous particles, as described in claim 1, wherein:

said drying means comprises at least one heat source disposed above the upper surface of said supporting means between the upper end and the lower end thereof.

9. An apparatus for forming substantially spherical solid pellets from droplets of a slurry of finely divided solid aluminous particles, as described in claim 8, and in addition:

a heat reflective member with a lower surface disposed above and spaced from the upper surface of said supporting means a distance at least sufficient for the free passage of a succession of droplets between the upper surface of said supporting means and the lower surface of said heat reflective member.

* * * * *